Feb. 1, 1966   H. C. GRAVES   3,232,662
COMBINATION TRAY AND SEAT APPARATUS
Filed March 25, 1965   2 Sheets-Sheet 1
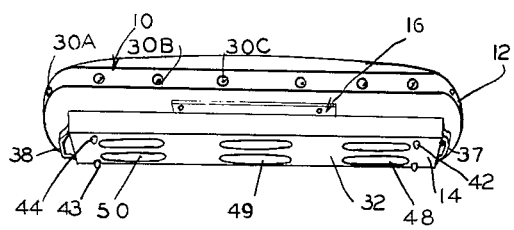
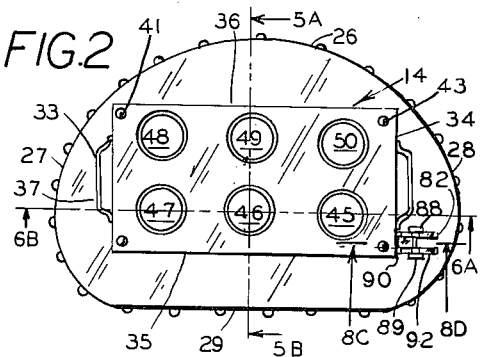
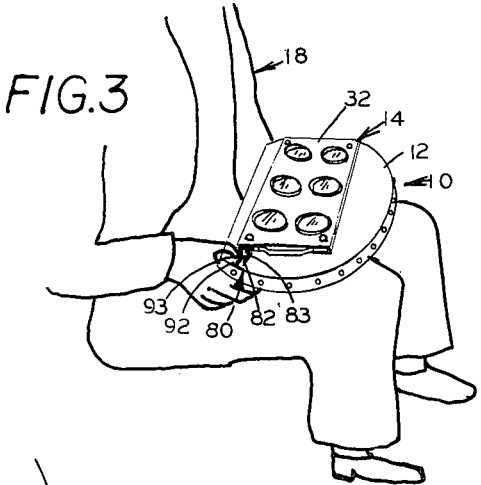
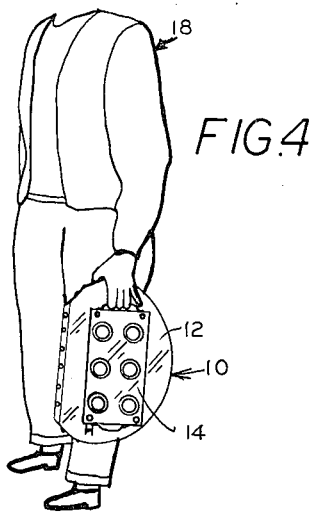
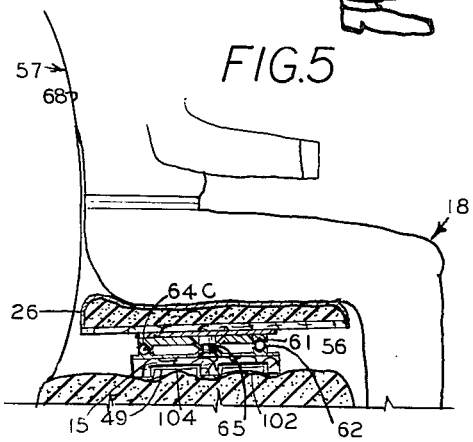
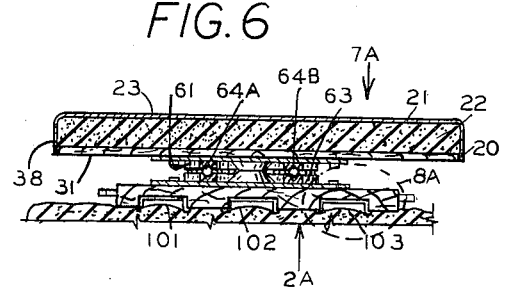
HAROLD C. GRAVES
INVENTOR.
BY
Ely Silverman
ATTORNEY Feb. 1, 1966 H. C. GRAVES 3,232,662
COMBINATION TRAY AND SEAT APPARATUS
Filed March 25, 1965 2 Sheets-Sheet 2

HAROLD C. GRAVES
INVENTOR.

BY
*Ely Silverman*
ATTORNEY

United States Patent Office 3,232,662
Patented Feb. 1, 1966

3,232,662
COMBINATION TRAY AND SEAT APPARATUS
Harold C. Graves, 2400 Washington St., Amarillo, Tex.
Filed Mar. 25, 1965, Ser. No. 442,709
6 Claims. (Cl. 297—119)

The present invention is an apparatus providing a portable combination swivel seat and a tray. The general character or class of article to which this invention relates is seats. More particularly, this invention relates to a firmly positionable swivel seat for a vehicle with such a structure as also adapts it for use as a tray. Alternatively, the apparatus may be regarded as a portable tray adapted as a swivel seat, particularly adapted for use in automotive vehicles.

The apparatus is not limited to the use on an automotive vehicle seat but may be used as a seat in any situation and allows swivel action thereof from an adequately firmly fixed base position; for instance, the apparatus is of utility for a spectator sitting in a grandstand allowing the spectator to turn about freely and, also, for the provision of a tray usable by such spectator.

One object of this invention is to provide a portable swivel seat attachment by means of which the user thereof can move to and from a firmly located forward facing position from and to a similarly located side facing position by a swivel action.

Another object of the invention is to provide a swivel seat attachment for automotive vehicle seats, the base of which swivel seat is readily and reliably secured thereto and removed therefrom without requiring structural changes in the vehicle seat.

A further object of the invention is to provide apparatus which serves as a dished tray supported on a wide and comfortable base as well as a seat, and which dished tray provides for supporting and locating food containers and articles and preventing them from sliding about.

Other objects of this invention will become apparent to those skilled in the art upon study of the below description, of which description the hereto attached drawings form a part and in which drawings the same numbers refer to the same parts throughout and wherein;

FIGURE 1 is a perspective view, from the bottom and front thereof, of a preferred embodiment 10, of apparatus according to this invention;

FIGURE 2 is a view of apparatus 10 when in use as in FIG. 3, as seen along the direction of the arrow 2A of FIGURE 6;

FIGURE 3 is a perspective view showing the apparatus, 10, of the invention in use as a tray;

FIGURE 4 shows the apparatus, 10, being carried;

FIGURE 5 is a sectional view of the apparatus, 10, of FIGURE 1 as viewed along plane 5A-5B of FIGURE 2, in use as a motor vehicle seat, and enlarged vertically to show bearing details (the man is not shown in section in this figure);

FIGURE 6 is a front sectional view of the apparatus, 10, of FIGURE 1 as seen along the section 6A-6B, in FIGURE 2 when in use as in FIG. 5 (end enlarged vertically as for FIGURE 5);

Figure 7:
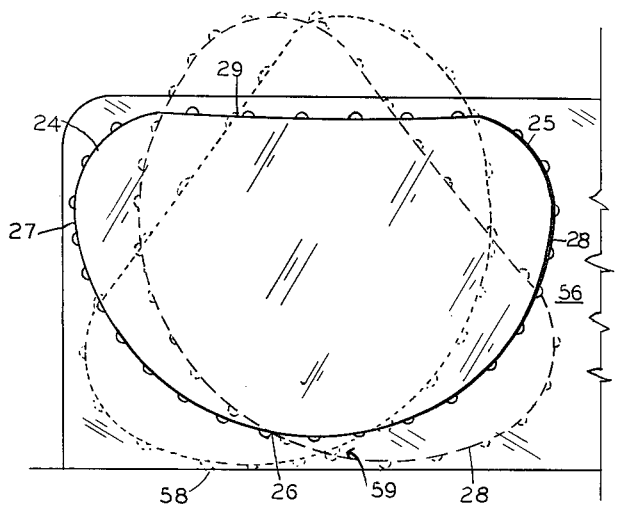
FIGURE 7 shows, in solid lines, a top or plan view, drawn to scale, of the apparatus 10 as seen along the direction of the arrow 7A of FIGURE 6 in the position of use shown in FIGURE 5: alternative positions are shown in dashed and dotted lines.

The apparatus generally shown as 10 comprises a seat sub-assembly 12, a base sub-assembly 14, and a bearing sub-assembly 15 therebetween. The bearing sub-assembly forms a firm yet rotatable connection between the sub-assembly 12 and sub-assembly 14.

The seat sub-assembly 12 comprises a rigid base 20, a tough skin, 21, and a mass of conventional stuffing such as foam rubber, 22, therebetween. The skin 21 is firmly held to the base 20 by plurality of conventional upholstery nails such as 30A, 30B, 30C.

The seat frame 20 and the entire seat sub-assembly 12, as shown in FIGURE 6, has a normally rounded top 23, and curved left front corner 24 and right front corner 25, a curved rear edge 26, a curved left edge 27, and a curved right edge 28, and a straight front edge 29. It is wider (from edge 27 to edge 28) than deep (edge 26 to edge 29).

In the preferred embodiment, 10, frame 20 is made of a one-half inch thick, five-ply-plywood; the skin is a $\frac{1}{32}$ inch thick opaque white vinyl coated oilcloth, and the stuffing is a resilient synthetic foam rubber.

The base sub-assembly 14 comprises a flat solid firm recessed rectangular base block 15, and handles. The recesses in the recessed block are each provided with a lip at the orifice of each recess that extends beyond the bottom surface of the block surface to improve the cooperation of the solid volume encompassed within the outline of block 15 and the spaces enclosed by the recesses, as below described. The block 15 has a flat top surface, 31, a flat bottom surface, 32, a straight left edge, 33, and a straight right edge, 34, parallel thereto, a front edge, 35, and a rear edge, 36, parallel thereto; a left handle, 37, and a right handle, 38, are firmly attached to edges 33 and 34 respectively.

The base sub-assembly 14 has firmly attached its lower surface 32 a series of short downwardly projecting nubby support elements 41, 42, 43, and 44 at the left rear, left front, right rear, and right front corners, respectively, of block 15.

The width of block 15 (measured from edge 33 to edge 34) is greater than its depth (measured from edge 35 to edge 36).

The lower surface 32 is generally smooth. Its geometric center is at the intersection of a straight line bisecting the distance between the front and rear edges of block 15 and a straight line bisecting the distance between the left and right edges of the block 15. This latter line is located parallel and directly below a line passing from front to rear of the base 20 and halfway between edges 27 and 28 of sub-assembly 12 in the position of apparatus 10 shown in FIGURES 2 and 5.

The block 15 is rounded at its edges (with, for instance, a ⅛ inch radius) and its lower surface, where flat, is smooth to the touch and varnished to avoid scratching or tearing clothing (in use as in FIG. 3) or car upholstery (in use as in FIG. 5).

The lower surface 32 has, symmetrically arrayed about its above described geometrical center, six similar recesses 45, 46, 47, 48, 49, and 50. Each of these recesses is depressed from the surface 32; each recess is in the same size shape and depth as the others and circular in the preferred embodiment, 10. The recess 45 is described in detail as this has the same structure as all the others (46, 47, 48, 49, and 50). Each of these recesses, as 45, has an imperforate base or bottom 55 and an imperforate side wall as 51. The entire length of the bottom edges of the side wall joins the bottom 55. The side wall surrounds an orifice 52 in surface 32 and meets the surface 32 at an orifice edge 53. The orifices are smoothly curved as seen in plan view (FIG. 2).

Each recess 45 has at its edge 53 a protruding lip 54. The lip 54 is smoothly rounded and resilient and serves to evenly contact and grip the usually resilient seat 56 of the usual automotive vehicle 57 in which the user 18 may be riding.

The base element sub-assembly 14 is a rigid piece of material such as, in the preferred embodiment, a piece of firm solid wood 13" x ¾" x 7", the recesses have a 2¾" diameter between the central portion of their edges as 53 (measured exclusive of liner 70) and each recess is ½" deep (measured exclusive of liner 70). In the preferred embodiment, each recess is lined with a liner 70; liner 70 is an imperforate ⅛" thick, soft, waterproof rubber sheet adherent to and completely covering the floor and sidewalls of the recess: liner 70 has a ¼" wide lip 54 semi-circular in transverse section at the edge 53 of the orifice. The liner 70 has a ⅛" overlap, 72, at the outer side 74 of the edge 53.

The bearing sub-assembly 16 comprises two horizontal rings 61 and 63 placed one (61) above the other (63), the lower one (63) being provided near its peripheral surface upon its inner face with two inclined surfaces and the inclination of said surfaces being in opposite directions, forming the bottom half of a raceway 62; the upper ring also is provided with two inclined surfaces, the inclinations being in opposite directions and forming the top half of raceway 62. A plurality of like spherical ball-bearing bodies 64A, 64B, 64C, loosely fit in said raceway 62 and bear against the faces of the raceway; a vertical pivot pin 65 rotatably yet firmly connects and holds together the rings or discs. It has expanded portions at its top and bottom to hold rings 61 and 63 together. This type of construction is shown generally in U.S. Patent 477,113, of June 14, 1892, to Gruneberg, which bearing also includes a plate interposed between the rings or discs and provided with a series of pockets and the bearing balls are located in those pockets; such a bearing could also be used in apparatus 10.

The upper plate 61 is firmly fixed to the base 20 of sub-assembly 14, as by screws, and the lower plate is firmly fixed, as by screws, to the base blocks 15, each plate extending beyond the outline of the raceway 61 but, for esthetic purposes, not beyond the outline (in the position of FIGS. 12 and 3 and 5) of the base block 15. The bearing sub-assembly pivot pin thus holds sub-assemblies 12 and 14 together and permits the ready portability of the apparatus 10 as shown in FIGURE 4.

The external diameter of the raceway 62 is, in the preferred embodiment, 5 inches i.e. substantially, in view of the space requirement for attachment of screws between sub-assemblies 12, 14, and 15, the full depth of the base of sub-assembly 14.

In the preferred embodiment the overall height of apparatus 10 is only 3½ inches; it is ¾ of an inch from the block 15 bottom surface 32 to its top surface 31 and only a quarter of an inch from the top surface of 31 of sub-assembly 14 to the bottom surface of sub-assembly 12; the seat 12 is 2½ inches in overall height.

Apparatus 10 is conveniently used as a tray as shown in FIGURE 3 by resting the then downwardly facing top of the seat sub-assembly 12 on the lap of the user 18. For this use the edge 29 of the seat is used as the rear edge for the tray. The greater width (from edge 27 to edge 28 of the seat sub-assembly (18 inches in the embodiment 10) over the (13") width of the base or tray sub-assembly 14 provides stability to the tray.

Figure 8:
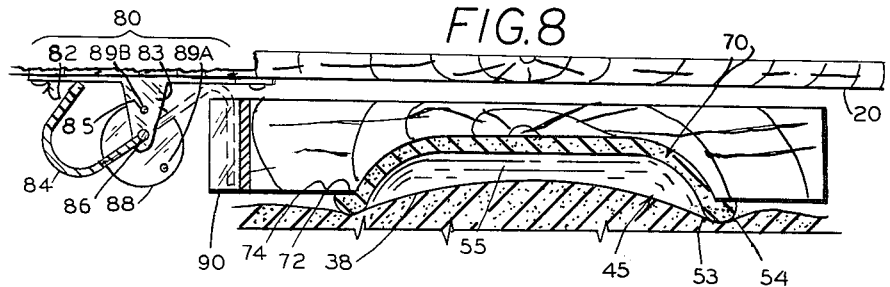
FIGURE 8 is an enlarged detail view of zone 8A of FIGURE 6 taken along the planes 6A-6B and 8C-8D of FIGURE 2; it shows the latch 80 in the position of use as in FIG. 5 in solid lines and in its position of use in FIGS. 3 and 4 in dashed lines.

A snap over latch sub-assembly 80 comprising two T-shaped bases 82 and 92, a pivotal locking arm 84 with a pin 86, locking plates 88 and 98 and a latch plate 90 (which sub-assembly) serves to hold the sub-assembly 14 in a fixed position relative to sub-assembly 12 when use thereof is desired in the position shown in FIGURE 3 or FIGURE 4. The arms of the T-shaped base 82 are firmly attached to the base 20 by conventional screws as shown in FIGURE 8. The pivotal arm 84 is firmly attached to pin 86 and is pivotally attached and supported by pivot pin 86 in holes or journals therefor in the feet 83 and 93 of the T (or tee) shaped bases 82 and 93, respectively.

A U-shaped latch plate 90 is firmly fixed to edge 34 of block 15 and an end of arm 84 distant from pin 86 fits therein smoothly. A pair of similar resilient locking plates 88 and 98, each firmly fixed to pin 86, each has two locking projections, as 89A and 89B on plate 88. These projections engage holes 85 and 95 respectively in the foot portion 83 and 93 respectively of bases 82 and 92 and serve to hold locking arm 84 firmly in either of two positions relative to the T-shaped bases 82 and 92. The plates 88 and 98 hold arm 84 in one position thereof (shown in solid lines in FIGURE 8) when the apparatus 10 is used in the position of FIGURE 5 (when sub-assemblies 12 and 14 are rotatable about the longitudinal axis of pin 65) or in the FIG. 3 position, as shown in dashed lines of FIGURE 8, contacting latch 90 on block 15 and locking therewith. The sub-assembly 80 thus provides, in the use desired in the position shown in FIGURES 3 and 4 and dashed lines of FIGURE 8, a fixed relationship of the sub-assembly 12 parallel to the sub-assembly 14.

The bases 82 and 92 and 84 are, in the preferred embodiment 10, each formed of conventional rigid sheet steel of about ¹⁄₁₆ inch thickness. When free rotation of the sub-assembly 12 relative to the sub-assembly 14 is desired, the arm 84 is moved to and held in a position therefor as shown in FIGURE 8 in solid lines, in which position there is no interference thereby with the rotary motion of sub-assembly 14 relative to sub-assembly 12.

Further, the apparatus 10, when located on the seat of the vehicle as in FIGURES 5, 6, and 7 is so arranged that the edges 53 and the lips 54 of each of the orifices such as 45 form a firm grip on the seat 38. A partial vacuum is formed in the space 70 between the lower (as in FIGURE 5) opening of the orifice 45 and the upper surface of the seat 58 when user 18 sits on the top of seat 20 of apparatus 10. Not only is there a vacuum created in orifices 45–50 by this mashing down of recessed block 15 on seat 58 but also a shifting of the bases sub-assembly backwards, forwards, or sideways of the position in which it is placed and held by the weight of the user (18) thereon is limited by the necessary upward travel of each lip on the adjacent upwardly sloped surface of seat 58 in order to provide such motions. The lips, being soft rubber, grab onto the seat surface therebelow by friction as well and are not readily moved. Also, other lips of other orifices are further pushed into the seat 58 when twisting movement of the block 15 is attempted with the user sitting thereon. Accordingly, the series of orifices 45–50 each with its protruding resilient lip (and firm imperforate block 15 in back of such lip) and imperforate cavity forming such recess provides a very effective grasp onto the vehicle's seat or cushion because of the projection of portions as 101, 102, 103 104 of the resilient seat or cushion 58 into said recesses (as shown in FIGURES 5, 6, and 8) and the resulting grasp of the lips as 72 thereon at least by friction on application of the weight of the user 18 to the seat sub-assembly 12. On removal of the weight of the user the grasp of the base 14 on the seat 58 is released. The weight of the user is applied to the bearing sub-assembly 16 and therefrom to the orifice edges symmetrically arrayed about the center of that sub-assembly whereby slipping of the apparatus 10 on seat 58 is avoided. The bottom, as 55, of each recess is flat and parallel to the surface 32. The size of the recess bottom is adequate to hold food containers and fluid containers of size usually held in an average person's hand, i.e. of diameter from two to four inches. This size hole also permits accommodation of the distended seat surface and co-operation therewith to secure the apparatus 10 in place as shown in FIGURE 5. The support stubs 41–44 support the smooth surface 32 of the tray on flat surfaces of grandstands, etc. whereas otherwise the smooth surface 32 of the sub-assembly 14 might otherwise be marred (stubs are rubber ½" high). The elliptical shape of the rear edge 26 of the seat minimizes contact of sub-assembly 12 with the rear seat as 57 with the edge as 28 of the seat sub-assembly 12 until the user has made a 60° turn. In the usual use of the apparatus 10 there is a certain amount of space, 59, between the rear edge 26 of the sub-assembly 12 and the upright or rear portion 68 of the seat 58; this permits the user 18 to easily turn from the position shown in FIGURE 5 to right or left to facilitate the operator to leave the vehicle as shown in dotted lines in FIG. 7 or to turn around within the vehicle as shown in dashed lines in FIGURE 7. FIGURE 7 is drawn to scale. The shape of the front edge 29 provides a maximum amount of support in that zone.

The distance between the left block edge 33 and the right edge 34 is greater than the distance between the rear edge 26 of the frame 20 and the front edge 29 thereof but less than the distance between edges 27 and 28 of frame 20. Also, the length of the rear base block edge 36 is such that it does not project beyond the outline of the curved rear edge 26 of the base 20 of the seat sub-assembly 12 of the apparatus 10 in the parallel position of the lengths of sub-assemblies 12 and 14 shown in FIGURES 2, 5, and 6.

According to this invention the friction between the seat of the driver's clothing and the seat is greatly reduced. Accordingly, the life of both the seat of the driver's (or passenger's) clothing is greatly lengthened not only for use in automobiles but wherever such user chooses to use this pivotal seat.

As illustrated in FIGURE 4, when the apparatus 10 is to be carried the user 18 holds the handle 37 or 38 and sub-assembly 12 is then fixed relative to sub-assembly 14 by latch sub-assembly 8 with the latch sub-assembly holding sub-assembly 12 and sub-assembly 14 as shown in FIGURE 3. This enhances the portability of apparatus 10.

The total cross sectional area of the recesses 45–50 is about 38 square inches and the total cross sectional area of the surface 32 is 91 inches while the periphery of the orifices is about 54 linear inches and while the linear outline of the base is 40 inches. This relationship of the orifices having a greater linear outline than the base and a smaller cross sectional area defines the range of sizes of the orifices relative to the block 15 covered by this invention.

The small overall height of apparatus 10 with the height less than depth or width of the apparatus allows its utility in present low-ceiling cars.

Although, in accordance with the provision of the patent statutes, particular preferred embodiment of this invention has been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. A combination seat and tray comprising a seat subassembly, a base subassembly and a bearing subassembly;
   said seat subassembly having a width, a depth, and a height and the width being greater than the depth, the depth being greater than the height;
   said base having a width, a depth and a height, said width being greater than said depth, and said depth being greater than the height, the width and depth of said seat respectively being greater than the width and depth of said base.
   said bearing subassembly being located between said seat and said base subassemblies, said bearing having a first portion firmly affixed to said base, a second portion firmly affixed to the seat, movable bearing surfaces between said first portion and said second portion and said first portion and said second portion pivotally joined by and held together by pivot means, said pivot means having a longitudinal axis, said portions rotating about said pivot means; and
   said base being formed of rigid material, said base having a smooth bottom surface, a plurality of recesses in said bottom surface, said recesses each open to said bottom surface, said recesses being symmetrically arranged about the geometrical center of said base on both sides of the said center, and said bearing pivot axis passing through the said geometrical center of said base.

2. Apparatus as in claim 1 wherein said recesses are from 2 to 4 inches in diameter and the bottom of said recesses are flat and parallel to the bottom surface of said base.

3. Apparatus as in claim 1 wherein said recesses each have distensible lips extending outward from the space which is outlined by said recess, and wherein each said recess has sidewall members and a base member, each said recess being open at its top, said base member being imperforate and substantially impermeable to air.

4. Apparatus as in claim 1, wherein said seat has a radius of curvature on its rear surface substantially less than the radius of curvature on the outline of the front edge thereof.

5. Apparatus as in claim 1 wherein said seat has a rigid firm base and a resilient upper portion, said seat is freely rotatable with respect to said base about said axis of said pivot pin.

6. Apparatus as in claim 5 comprising latch means, said latch means comprising one part located on and fixed to said base sub-assembly and another part attached to said seat subassembly, one part being engageable with the other to prevent rotation of the seat subassembly and the base subassembly.

References Cited by the Examiner
UNITED STATES PATENTS

| | | | |
|---|---|---|---|
| 160,455 | 3/1875 | Mitchell | 108—43 |
| 1,199,063 | 9/1916 | Fleich | 108—139 |
| 2,141,001 | 12/1938 | Horsley | 108—139 |
| 2,564,338 | 8/1951 | McCarroll | 108—62 |
| 2,576,004 | 11/1951 | Fair | 297—240 X |
| 2,833,609 | 5/1958 | Lawless | 108—62 |
| 2,914,793 | 12/1959 | McMahan | 297—349 X |
| 3,032,916 | 5/1962 | Oakes | 108—41 |
| 3,043,622 | 7/1962 | Milner | 297—240 |
| 3,104,139 | 9/1963 | Thompson | 297—349 X |
| 3,113,804 | 12/1963 | Ritter | 297—349 X |

FRANK B. SHERRY, *Primary Examiner.*

J. T. McCALL, *Assistant Examiner.*